Aug. 6, 1940.  H. A. PAYNE  2,210,336
BRAKE ADJUSTER
Filed March 28, 1938
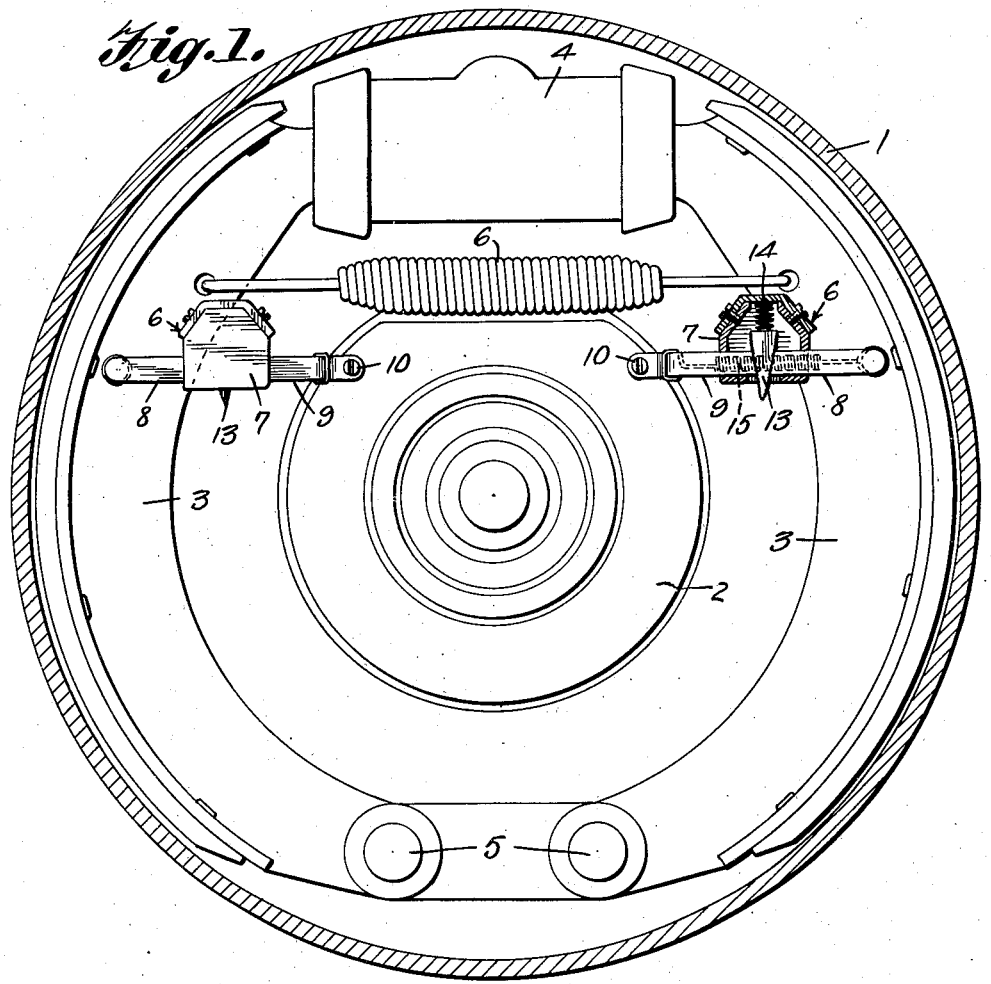
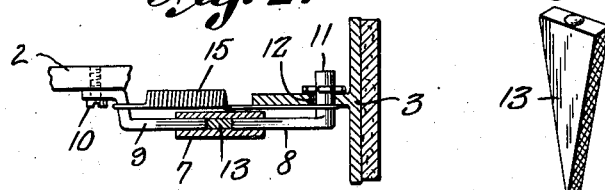 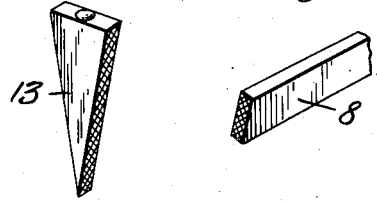
Hubert A. Payne, INVENTOR
BY Victor J. Evans & Co.
ATTORNEYS Patented Aug. 6, 1940

2,210,336

UNITED STATES PATENT OFFICE 2,210,336

BRAKE ADJUSTER

Hubert A. Payne, Clinton, N. J.

Application March 28, 1938, Serial No. 198,525

8 Claims. (Cl. 188—79.5)

This invention relates to brake adjusters and has for the primary object the provision of an efficient and inexpensive device of this character which is easily adaptable to a brake shoe and will automatically adjust said shoe relative to the brake drum as wear occurs on the lining of the shoe, and will maintain proper clearance between said shoe and the drum when said shoe is disengaged from the drum to prevent brake dragging and overheating incident thereto.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view showing brake shoes and a brake drum equipped with the present invention.

Figure 2 is a fragmentary longitudinal sectional view showing the adjuster connected to one of the brake shoes.

Figure 3 is a perspective view illustrating a wedge element forming part of the adjuster.

Figure 4 is a fragmentary perspective view showing one of the arms of the brake adjuster which contacts the wedge.

Referring in detail to the drawing, the numeral 1 indicates a brake drum, 2 a fixed guard plate therefor. The guard plate supports brake shoes 3 of a conventional construction and of a type hydraulically actuated. The hydraulic cylinder of the shoes is indicated at 4 and each shoe is pivotally mounted, as shown at 5. The construction described is common in motor vehicle brake construction. The shoes are urged away from the drum by the usual spring 6 connected to said shoes.

In adapting the present invention to brake shoes of the character shown and described each shoe has an automatic adjuster 6 connected thereto and to the fixed shield plate 2 of the brake drum. As the adjusters 6 are identical in construction only one will be described in detail. These adjusters automatically maintain the brake shoes with a proper or desired clearance between said brake shoes and the drums when the brakes are in non-brake applying positions. However, as the linings of the brake shoes wear said brake shoes will be moved toward the brake drum to maintain a selected clearance, consequently keeping the brake shoes properly adjusted at all times with respect to the drum.

The adjuster includes a housing 7 which slidably receives the free ends of the opposed arms 8 and 9. The arm 9 is secured on the plate 2 by a fastener 10 and the arm 8 has an offset portion 11 extending through an opening 12 in the brake shoe. A desired clearance is provided between the walls of the opening 12 and the portion 11 of the arm 8. This clearance provided is for the purpose of maintaining a desired clearance between the brake shoe and the drum 1.

Slidably mounted in the housing 7 is a wedge 13 engaging the opposing ends of the arms 8 and 9 under the action of a spring 14. The end 11 of the arm 8 is connected to the arm 9 by a contractile spring 15 tending to urge the arms 8 and 9 in engagement with the wedge 13 at all times.

The size of the opening 12 is sufficient to permit normal movement of the brake shoe into and out of engagement with the drum without effecting movement of the arm 8. However, when the brake shoe has a greater movement than normal due to wear occurring on the brake lining, the arm 8 is moved and as the arm 8 is moved the wedge 13 moves downwardly checking the reverse movement of the arm 8 which in turn checks the movement of the brake shoe away from the brake drum when the brakes are released so that the brake shoe will be maintained when in non-brake applying position with the proper clearance between itself and the brake drum. Thus it will be seen that the adjuster will automatically advance the brake shoe towards the brake drum as wear occurs in the brake lining so that the brake shoe will always have approximately the same clearance between itself and the drum thereby maintaining the brake shoe in proper adjusted position to give efficient braking action on the drum.

What is claimed is:

1. In combination with a brake drum and a fixed shield plate therefor and a pivotally mounted brake shoe on said shield plate, a housing, opposed arms having one end slidably supported by said housing one of said arms being fixed on said shield plate and the other arm pivotally and loosely connected with the brake shoe, spring means connecting said arms to urge them in the direction of each other, and a spring actuated wedge coacting with the adjacent ends of said arms to advance the said second-mentioned arm in a direction to advance the brake shoe toward the brake drum as wear occurs on the brake shoe to maintain the brake shoe with a determined clearance between itself and the drum when not engaged with the brake drum.

2. In a brake, the combination of a brake and a stationary plate adjacent thereto having companion brake shoes pivoted thereto and adapted to engage the inner periphery of the drum, with arms carried by the plate, arms in longitudinal alignment with the first-mentioned arms adapted to be axially actuated by the brake shoes, means to hold the said first and second-mentioned arms in alignment, and a wedge-shaped member interposed between the said arms and engageable with the ends thereof to maintain the same in fixed spaced relation with each other.

3. In a brake, the combination of a brake drum and a stationary plate adjacent thereto having companion brake shoes pivoted thereto and adapted to engage the inner periphery of the drum with arms carried by the plate, arms in longitudinal alignment with the first-mentioned arms adapted to be axially actuated by the brake shoes, a housing slidably receiving the free ends of the arms, a wedge-shaped member disposed within the housing and interposed between the said arms and engageable with the free ends thereof to maintain the same in fixed spaced relation with each other, and spring means to constantly urge the said wedge-shaped member to effectively lock the said arms in position in the event they are moved apart.

4. In a brake, the combination of a brake drum and the stationary plate adjacent thereto having companion brake shoes pivoted thereto and adapted to engage the inner periphery of the drum, with arms carried by the plate, arms in longitudinal alignment with the first-mentioned arms adapted to be axially actuated by the brake shoes, a wedge-shaped member transversely interposed between the said arms and engageable with the free ends thereof to maintain the same in fixed spaced relation with each other, spring means to constantly urge the said wedge-shaped member to effectively lock the said arms in position in the event they are moved apart, and spring means joining the said arms to hold the same in engagement with the said wedge-shaped member.

5. In a brake, the combination of a brake drum and a stationary plate adjacent thereto having companion brake shoes pivoted thereon with arms secured to the plate, arms adapted to be actudated by the shoes upon movement of the same beyond a predetermined limit, an adjusting wedge transversely interposed between the free ends of the said arms and adapted to lock the same in the adjusted position upon a divergent movement therebetween, and resilient means to constantly urge the said wedge into engagement with the said arms.

6. In a brake, the combination of a brake drum and a stationary plate adjacent thereto having companion brake shoes pivoted thereon with arms secured to the plate, arms adapted to be actuated by the shoes upon movement of the same beyond a predetermined limit, an adjusting wedge transversely interposed between the free ends of said arms and adapted to lock the same in the adjusted position upon a divergent movement therebetween, resilient means to constantly urge the said wedge into engagement with the said arms, and spring means connecting the said arms to continually urge the same into engagement with the said wedge.

7. In a brake, a brake drum, a stationary plate adjacent the said drum, companion brake shoes pivoted to the plate and adapted to engage the inner periphery of said drum, a housing, an arm having one end secured to the plate and the other end thereof received within the housing, an arm having one end attached to the said shoes and with the other end thereof received within the housing and in longitudinal alignment with the said first-mentioned arm, a wedge positioned within the housing and interposed between the said first and second-mentioned arms, and spring means coacting with the wedge to maintain the same in engagement with the said arms.

8. In a brake, a brake drum, a stationary plate adjacent the said drum, companion brake shoes pivoted to the plate and movable into engagement with the inner periphery of said drum, a housing, an arm having one end secured to the plate and the other end thereof received within the housing, an arm having one end attached to the said shoes and with the other end thereof received within the housing and in longitudinal alignment with the said first-mentioned arm, a wedge positioned within the housing and interposed between the said first and second-mentioned arms, spring means coacting with the wedge to maintain the same in engagement with the said arms, and spring means connecting the arms to continually urge the same into engagement with the said wedge.

HUBERT A. PAYNE.